(12) United States Patent
Renzi

(10) Patent No.: US 6,837,000 B2
(45) Date of Patent: Jan. 4, 2005

(54) PEST CONTROL DEVICE

(76) Inventor: Guy C. Renzi, 369-78th St., Brooklyn, NY (US) 11209

( * ) Notice: Subject to any disclaimer, the term of this patent is extended or adjusted under 35 U.S.C. 154(b) by 0 days.

(21) Appl. No.: 10/655,849

(22) Filed: Sep. 5, 2003

(65) Prior Publication Data
US 2004/0045214 A1 Mar. 11, 2004

Related U.S. Application Data

(63) Continuation-in-part of application No. 10/420,598, filed on Apr. 22, 2003, now Pat. No. 6,715,231, which is a continuation of application No. 10/093,723, filed on Mar. 8, 2002, now Pat. No. 6,581,323.
(60) Provisional application No. 60/324,433, filed on Sep. 24, 2001, and provisional application No. 60/487,537, filed on Jul. 15, 2003.

(51) Int. Cl.$^7$ .............................................. A01M 1/24
(52) U.S. Cl. .......................................... 43/124; 52/101
(58) Field of Search .......................... 43/65–67, 77–79, 43/119, 124, 107, 132.1; 52/101; 49/58, 50, 495.1; 40/427; 119/481

(56) References Cited

U.S. PATENT DOCUMENTS

| | | | | |
|---|---|---|---|---|
| 124,149 A | * | 2/1872 | Newell | 43/79 |
| 214,715 A | * | 4/1879 | Scully | 49/495.1 |
| 478,930 A | * | 7/1892 | Ewert | 119/481 |
| 770,906 A | * | 9/1904 | Hoyt | 43/119 |
| 831,380 A | * | 9/1906 | Salokar | 43/119 |
| 885,481 A | * | 4/1908 | Joachim | 43/65 |
| 891,012 A | | 6/1908 | Shepard | 210/131 |
| 934,469 A | | 9/1909 | Shoup | 43/66 |
| 1,152,980 A | | 9/1915 | Ryason | 43/65 |
| 1,234,629 A | * | 7/1917 | Clapp | 43/65 |
| 1,335,359 A | | 3/1920 | Beisel | 43/66 |
| 1,412,649 A | * | 4/1922 | Bitonti | 43/66 |
| 1,527,328 A | * | 2/1925 | Percich | 43/79 |
| 1,706,541 A | * | 3/1929 | Prokop | 43/79 |
| 1,782,661 A | * | 11/1930 | Midgett | 43/66 |
| 1,965,177 A | * | 7/1934 | Finkl | 43/124 |
| 2,119,828 A | * | 6/1938 | Nordenstam | 43/65 |
| 2,163,938 A | | 6/1939 | Dickson | 33/561.1 |
| 2,178,789 A | * | 11/1939 | Heath | 43/66 |
| 2,181,595 A | * | 11/1939 | Bruce | 43/119 |

(List continued on next page.)

FOREIGN PATENT DOCUMENTS

| | | | | |
|---|---|---|---|---|
| DE | 3818909 A1 | * | 12/1989 | |
| GB | 2276901 A1 | * | 10/1994 | |
| GB | 2276901 A | | 10/1994 | ............. E06B/9/06 |

Primary Examiner—Darren W. Ark
(74) Attorney, Agent, or Firm—Walter J. Tencza, Jr.

(57) ABSTRACT

A technique is provided for keeping rodents and other pests out of warehouses and other buildings. A pest control device or guard is provided which is attached or fixed near the bottom surface of a garage door. The pest control device can adjust to uneven ground surfaces so that a fence or guard is provided to prevent pests, such as rats from entering buildings. The pest control device may be comprised of first, second, and third brackets which are connected together and can be mounted to a garage door. The brackets may be L-shaped. A plurality of pins is connected to the first, second, and third brackets so that each of the plurality of pins can move with respect to the first, second, and third brackets.

9 Claims, 16 Drawing Sheets

U.S. PATENT DOCUMENTS

| | | | | |
|---|---|---|---|---|
| 2,183,926 A | * | 12/1939 | Willis | 43/79 |
| 2,424,361 A | * | 7/1947 | McDonald | 49/50 |
| 2,595,130 A | * | 4/1952 | Edwards | 43/77 |
| 2,668,729 A | * | 2/1954 | Watters | 49/50 |
| 2,777,171 A | | 1/1957 | Bumside et al. | 52/101 |
| 2,842,891 A | * | 7/1958 | Neid | 43/66 |
| 2,888,716 A | | 6/1959 | Kaufmann | 52/101 |
| 2,949,674 A | | 8/1960 | Wexler | 33/561.1 |
| 3,122,856 A | * | 3/1964 | Jones | 43/66 |
| 3,191,239 A | | 6/1965 | Moore et al. | 52/101 |
| 3,282,000 A | * | 11/1966 | Shaw | 43/77 |
| 3,368,304 A | * | 2/1968 | Ball | 49/58 |
| 3,393,468 A | * | 7/1968 | Wood et al. | 43/66 |
| 3,543,433 A | * | 12/1970 | Jackson | 43/78 |
| 3,736,583 A | | 5/1973 | Smith et al. | 340/540 |
| 3,854,246 A | * | 12/1974 | McAllister | 43/107 |
| 4,069,615 A | * | 1/1978 | Gilbert | 43/107 |
| 4,149,341 A | * | 4/1979 | Ackerson | 49/49 |
| 4,214,399 A | * | 7/1980 | Bradley | 43/66 |
| 4,266,362 A | * | 5/1981 | Campbell et al. | 43/66 |
| 4,356,087 A | | 10/1982 | Miles | 210/131 |
| 4,536,980 A | | 8/1985 | Fleming | 40/427 |
| 4,653,221 A | * | 3/1987 | Pratscher | 43/79 |
| 4,654,989 A | | 4/1987 | Fleming | 40/427 |
| 4,765,094 A | * | 8/1988 | Gemmell | 49/58 |
| 5,058,335 A | * | 10/1991 | Richter | 52/101 |
| 5,067,271 A | * | 11/1991 | Henning | 43/65 |
| 5,090,152 A | * | 2/1992 | Ling | 43/65 |
| 5,214,880 A | * | 6/1993 | Woodruff et al. | 49/495.1 |
| 5,235,779 A | * | 8/1993 | Saleman | 43/67 |
| 5,257,474 A | * | 11/1993 | Burgos | 43/107 |
| 5,400,552 A | * | 3/1995 | Negre | 52/101 |
| 5,451,239 A | * | 9/1995 | Sewell et al. | 52/101 |
| 5,465,532 A | * | 11/1995 | Varin | 49/58 |
| 5,611,171 A | * | 3/1997 | Hershey | 43/66 |
| 5,713,160 A | * | 2/1998 | Heron | 52/101 |
| 5,765,319 A | * | 6/1998 | Callaghan, Jr. | 52/101 |
| 5,771,627 A | | 6/1998 | Mattson et al. | 43/100 |
| 5,796,620 A | | 8/1998 | Laskowski et al. | 700/197 |
| 5,836,114 A | * | 11/1998 | Ohba | 52/101 |
| 5,924,237 A | | 7/1999 | Ives | 43/100 |
| 5,943,812 A | * | 8/1999 | Pizzolato | 43/65 |
| 5,974,725 A | | 11/1999 | Knight | 43/100 |
| 6,035,575 A | | 3/2000 | Hilty | 43/100 |
| 6,158,165 A | | 12/2000 | Wilson | 43/66 |
| 6,189,246 B1 | | 2/2001 | Gorthala | 40/446 |
| 6,298,587 B1 | | 10/2001 | Vollom | 40/427 |
| 6,581,323 B2 | * | 6/2003 | Renzi | 43/124 |
| 6,715,231 B2 | * | 4/2004 | Renzi | 43/124 |
| 2004/0103578 A1 | * | 6/2004 | Hagen et al. | 43/79 |

* cited by examiner

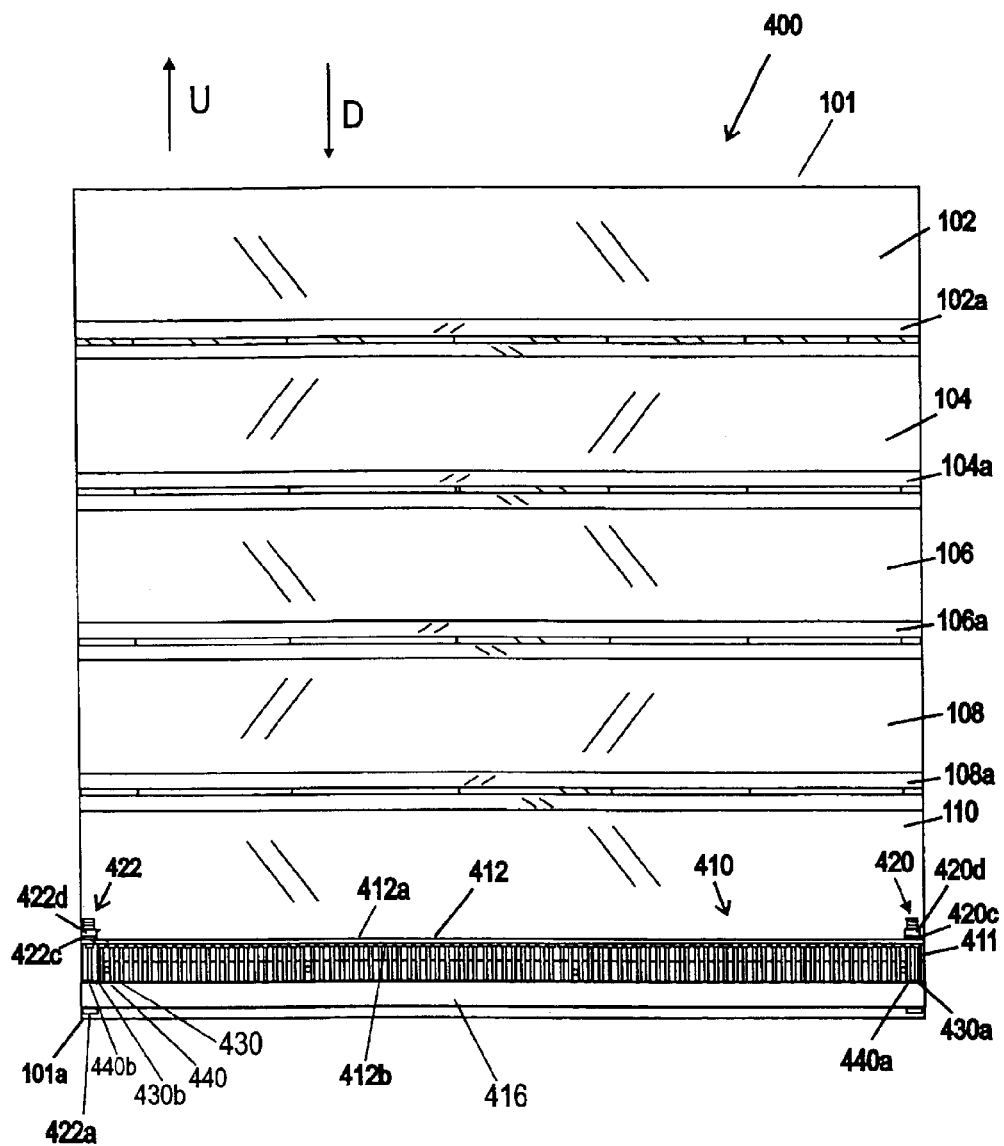

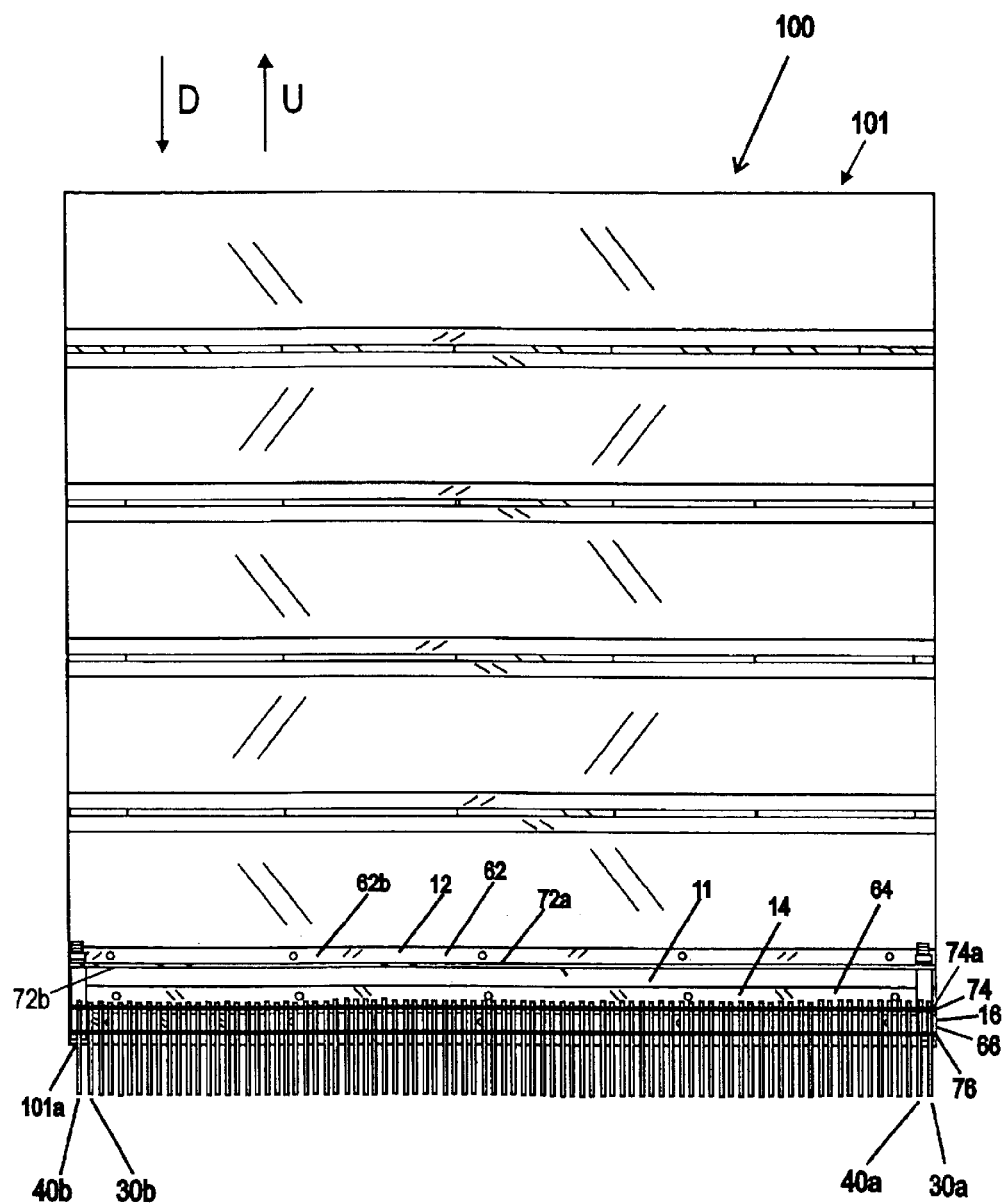

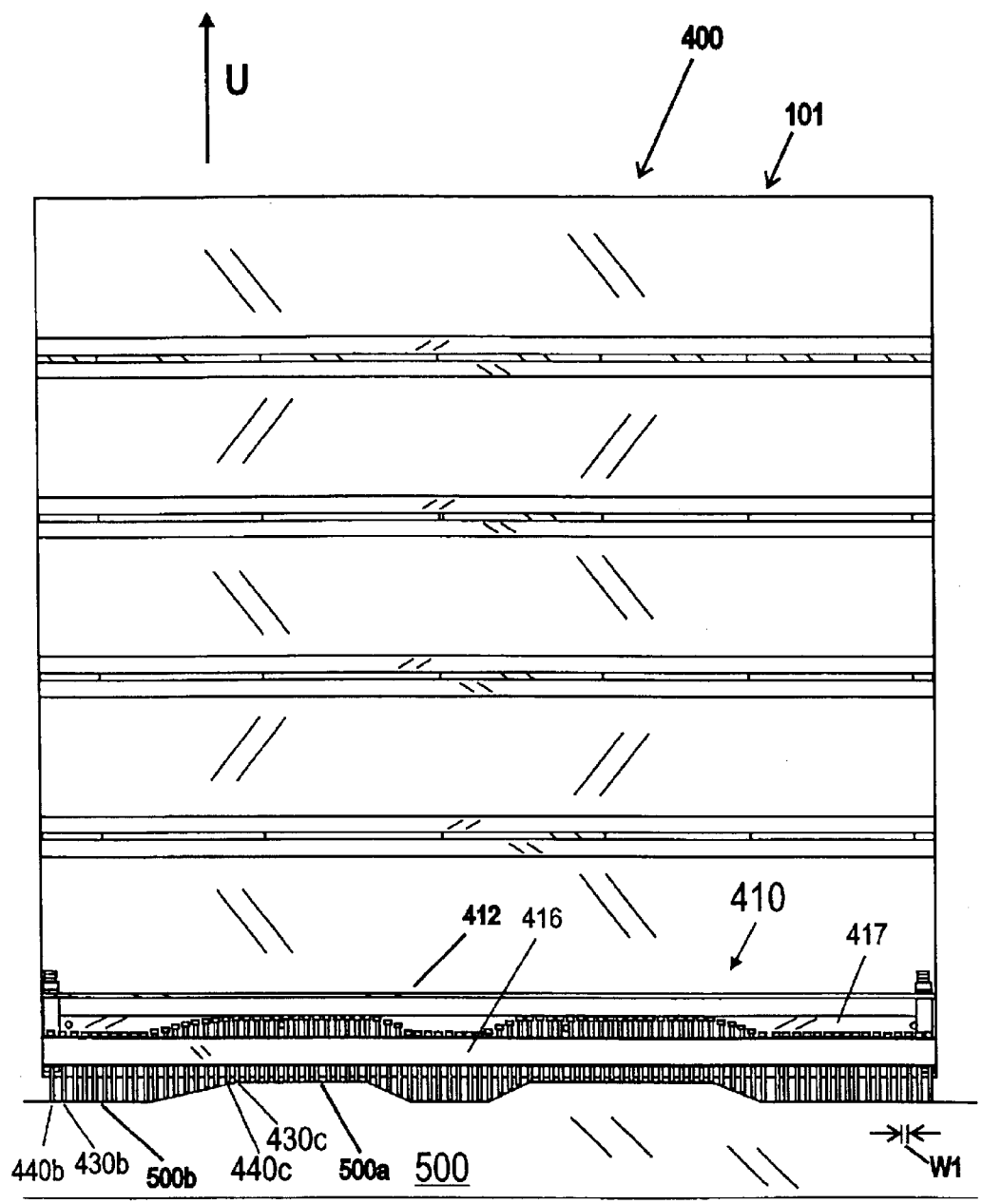

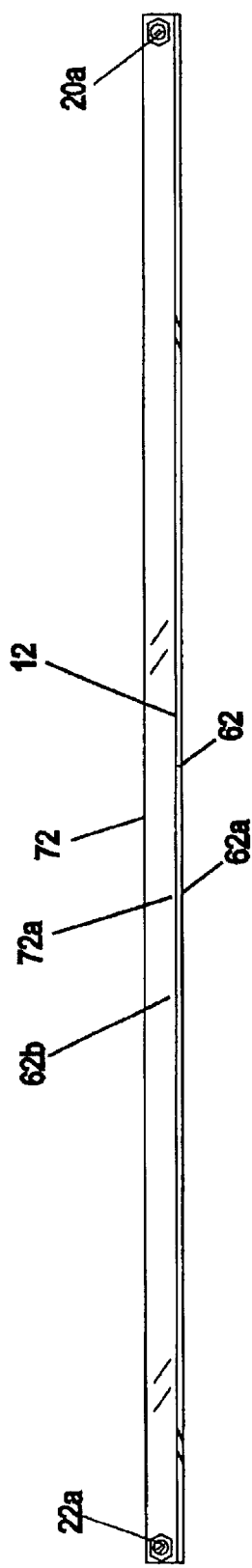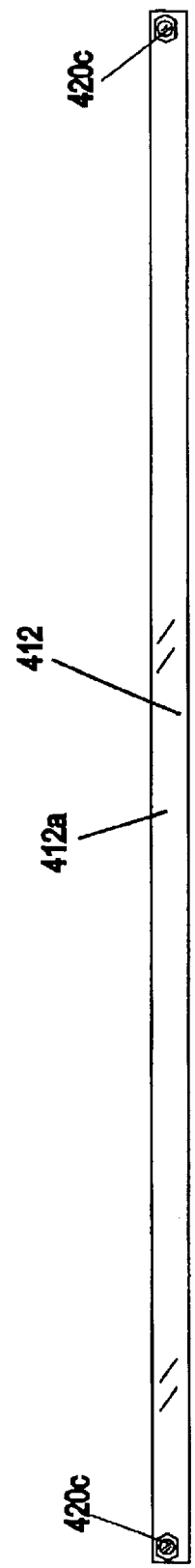

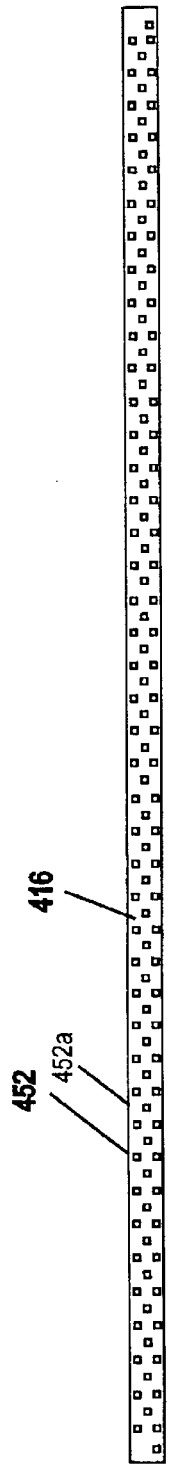
Fig. 6C
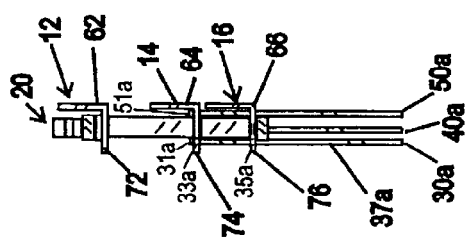
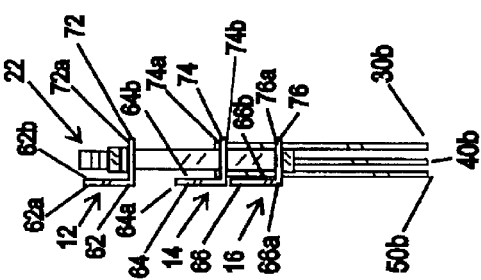

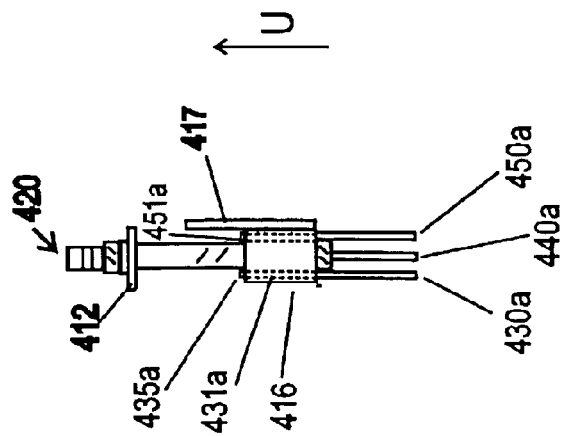
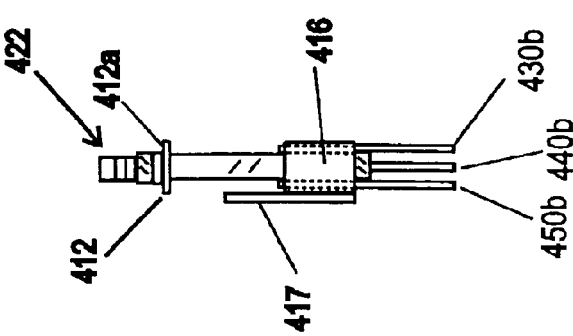

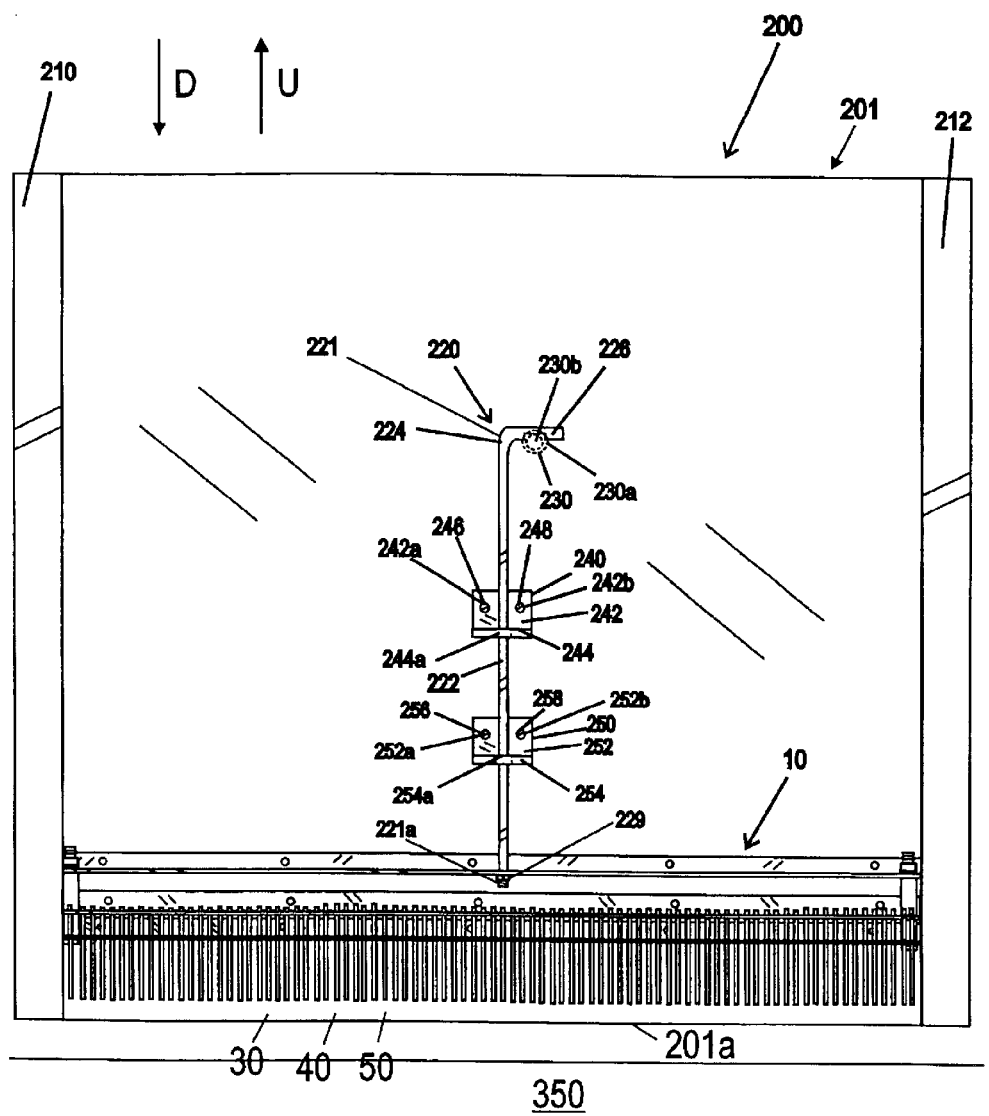

PEST CONTROL DEVICE

CROSS REFERENCE TO RELATED APPLICATION AND CLAIM FOR PRIORITY

This application is a continuation in part of and claims the priority of patent application Ser. No. 10/420,598, filed Apr. 22, 2003 U.S. Pat. No. 6,715,231, titled "Pest Control Device" which is a divisional application of and which claims the priority of parent patent application Ser. No. 10/093,723, filed on Mar. 8, 2002, issued as U.S. Pat. No. 6,581,323, on Jun. 24, 2003, which claims the priority of provisional Application No. 60/324,433 filed on Sep. 24, 2001, inventor Guy Renzi. This present application also claims the priority benefit of a provisional application Ser. No. 60/487,537 filed on Jul. 15, 2003.

FIELD OF THE INVENTION

This invention relates to improved methods and apparatus concerning preventing pests from entering a building.

BACKGROUND OF THE INVENTION

Typically in the prior art a garage door or warehouse door protecting a building has a flat bottom surface. When the door is lowered the flat bottom surface comes in contact with a ground surface. If the ground surface is even, then the door prevents pests, such as rodents from coming into the building. However, particularly in a warehouse setting, the ground surface frequently becomes uneven due to, for example, the operation of heavy equipment such as forklifts. When the ground surface is uneven, the flat bottom surface of the garage or warehouse door does not contact all of the ground surface. This creates gaps through which a rodent can gain entry into the building. This is a particular problem in warehouses where food is stored and where it is particularly important to keep pests out.

SUMMARY OF THE INVENTION

The present invention provides a technique for keeping rodents and other pests out of warehouses and other buildings. In one embodiment a pest control device or guard is provided which is attached or fixed near the bottom surface of an overhead door. The pest control device can adjust to uneven ground surfaces so that a fence or guard is provided to prevent pests, such as rats from entering buildings.

In one embodiment the pest control device may be comprised of first, second, and third brackets. The brackets may be L-shaped. A plurality of pins is connected to the first, second, and third brackets so that each of the plurality of pins can move with respect to the first, second, and third brackets. The first bracket may prevent each of the plurality of pins from moving in a first direction beyond a first location and the second bracket may prevent each of the plurality of pins from moving in a second direction, which is opposite the first direction beyond a second location.

Each of the plurality of pins may be inserted through corresponding holes in the second and third brackets. The first bracket may be mounted near the bottom surface of a garage door. One or more of the brackets may be eliminated, so that for example one bracket may be provided or two brackets instead of three. Also one or more brackets may be replaced by plates or bars only, instead of L-shaped brackets.

The one or more brackets may be fixed to the door so that each of the plurality of pins is substantially perpendicular to the bottom surface of the door. The one or more brackets are typically fixed to each other by attachment devices, which may comprised bolts, nuts, and spacers.

A method is also disclosed comprising the step of attaching a pest control device to a door. The pest control device may be of a form as previously described.

BRIEF DESCRIPTION OF THE DRAWINGS

FIG. 1B shows a rear view of an apparatus of a second embodiment of the present invention including a second pest control device attached to a door with the pest control device shown in a first state;

FIG. 2A shows rear view of the apparatus of FIG. 1A with the first pest control device shown in a second state;

FIG. 3B shows a rear view of the apparatus of FIG. 1B with the second pest control device shown in a third state (some up and some down, shown uneven surface);

FIG. 5A shows a top view of the first pest control device;

FIG. 5B shows a top view of the second pest control device;

FIG. 6C shows a bottom view of a bar having a plurality of pin holes for use in the second pest control device;

FIG. 7A shows a right side view of the first pest control device;

FIG. 7B shows a right side view of the second pest control device;

FIG. 8A shows a left side view of the first pest control device;

FIG. 8B shows a left side view of the second pest control device;

FIG. 9A shows another embodiment of the present invention wherein a device for raising and lowering the first (or the second) pest control device is provided, with the first pest control device shown in a raised position;

DETAILED DESCRIPTION OF THE DRAWINGS

Figure 1A:
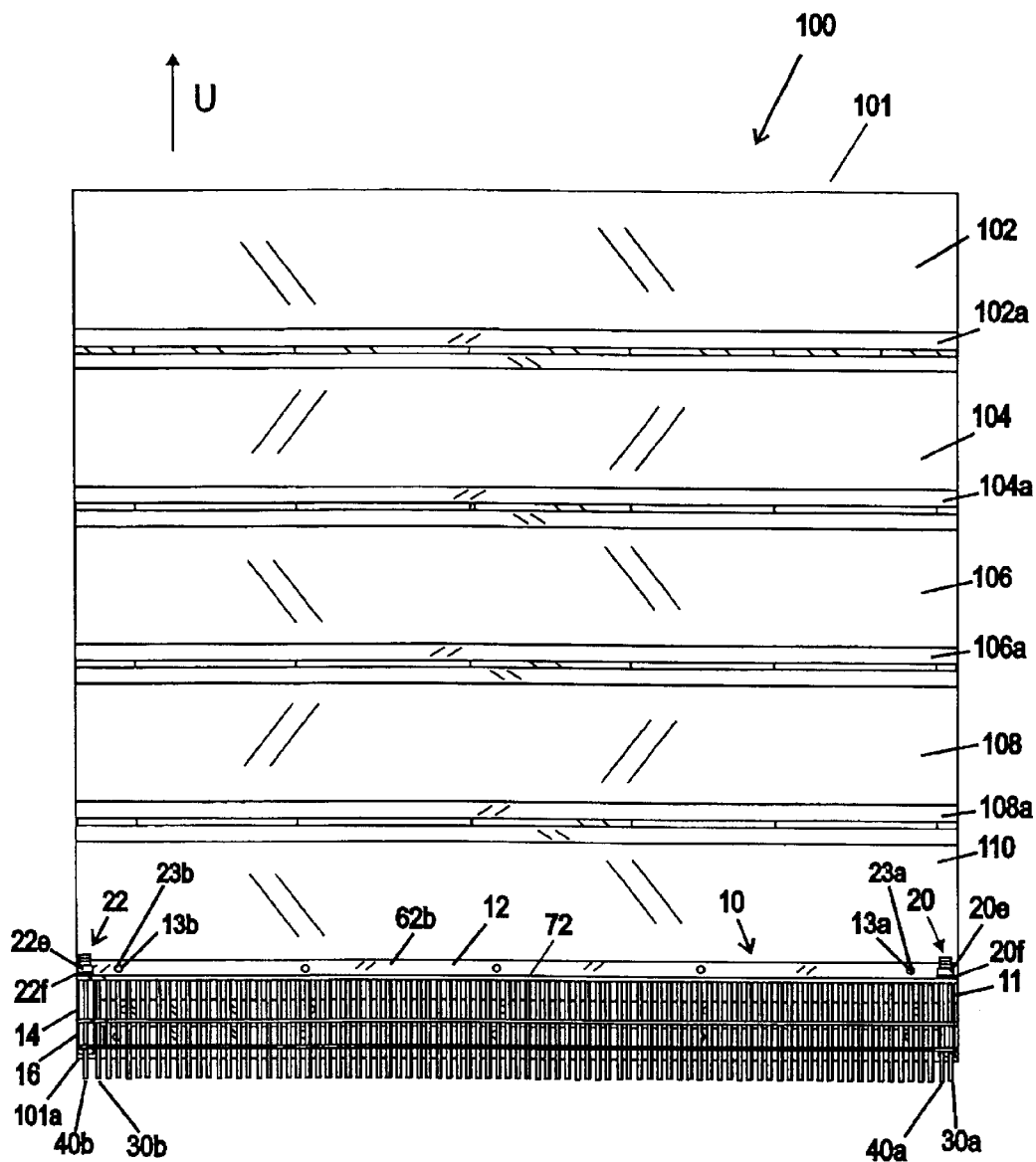
FIG. 1A shows a rear view of an apparatus of a first embodiment of the present invention including a first pest control device attached to a door with the first pest control device shown in a first state.
Figure 2B:
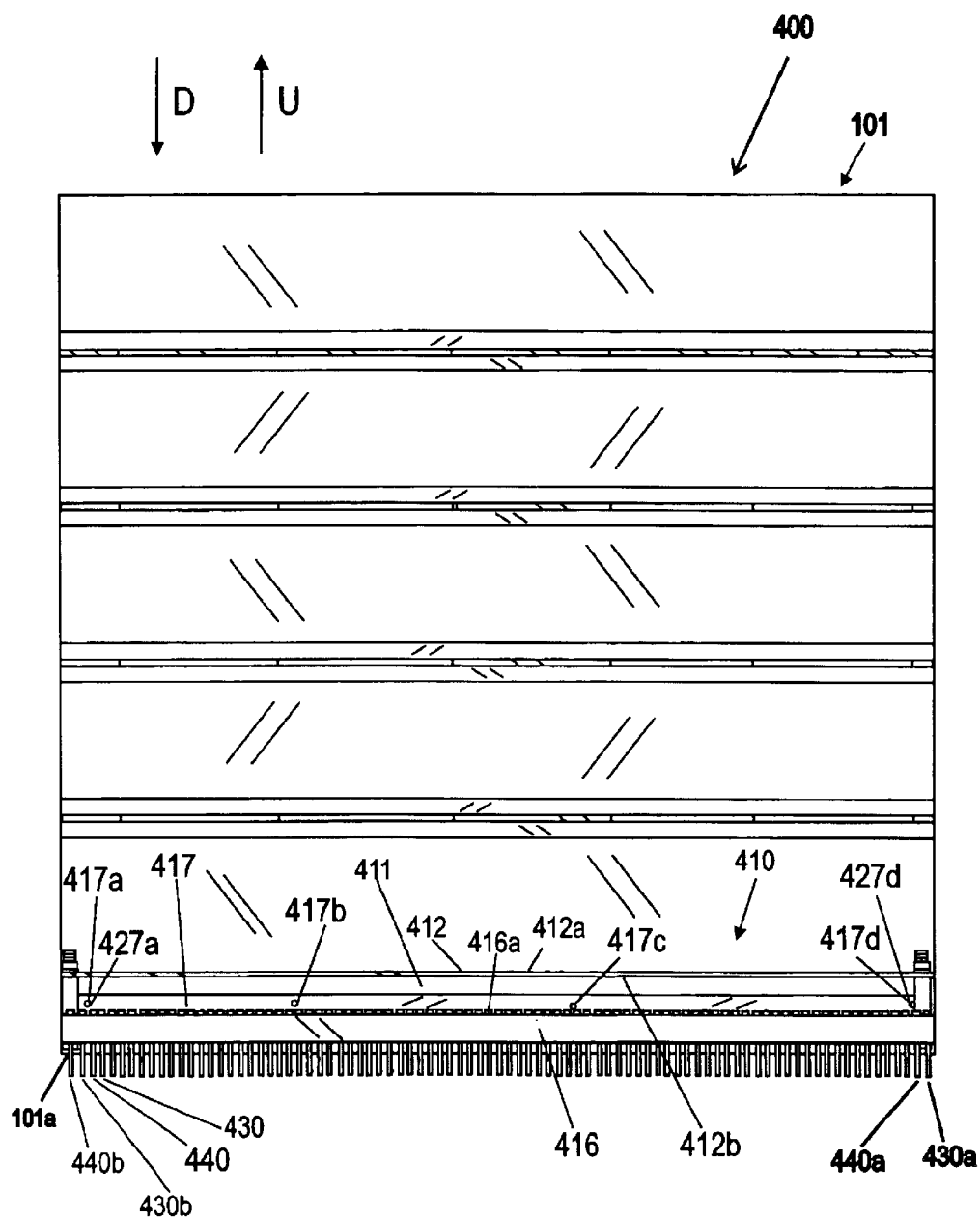
FIG. 2B shows rear view of the apparatus of FIG. 1B with the second pest control device shown in a second state.
Figure 3A:
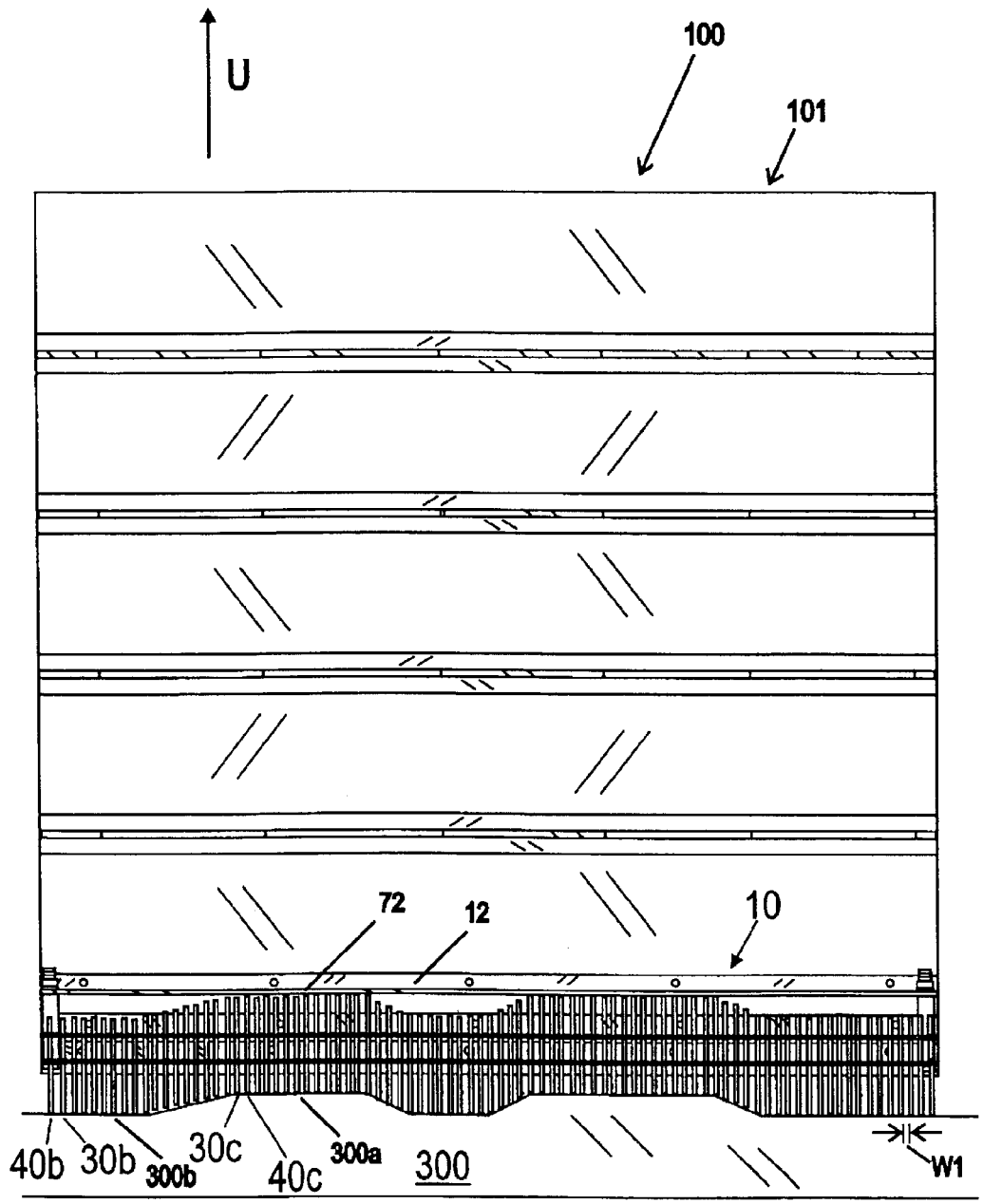
FIG. 3A shows a rear view of the apparatus of FIG. 1A with the first pest control device shown in a third state (some up and some down, shown uneven surface)

FIGS. 1A, 2A, 3A, 4A, 5A, 6A, 7A, and 8A refer to a first pest control device 10 in accordance with a first embodiment of the present invention. FIG. 1A shows a rear view of an apparatus 100 including the pest control device 10 attached to a door 101 with the pest control device 10 shown in a first state. FIG. 2A shows a rear view of the apparatus 100 of FIG. 1A with the pest control device 10 shown in a second state. FIG. 3A shows a rear view of the apparatus 100 of FIG. 1A with the pest control device 10 shown in a third state.

The door 101 may be a conventional roll down door such as used in warehouses or garages. The door 101 may have a bottom surface 101a. The door 101 may be comprised of panels 102, 104, 106, 108, and 110. The panels may be connected by hinges. Panels 102 and 104 may be connected by hinge 102a. Panels 104 and 106 may be connected by hinge 104a. Panels 106 and 108 may be connected by hinge 106a. Panels 108 and 110 may be connected by hinge 108a.

Figure 4A:
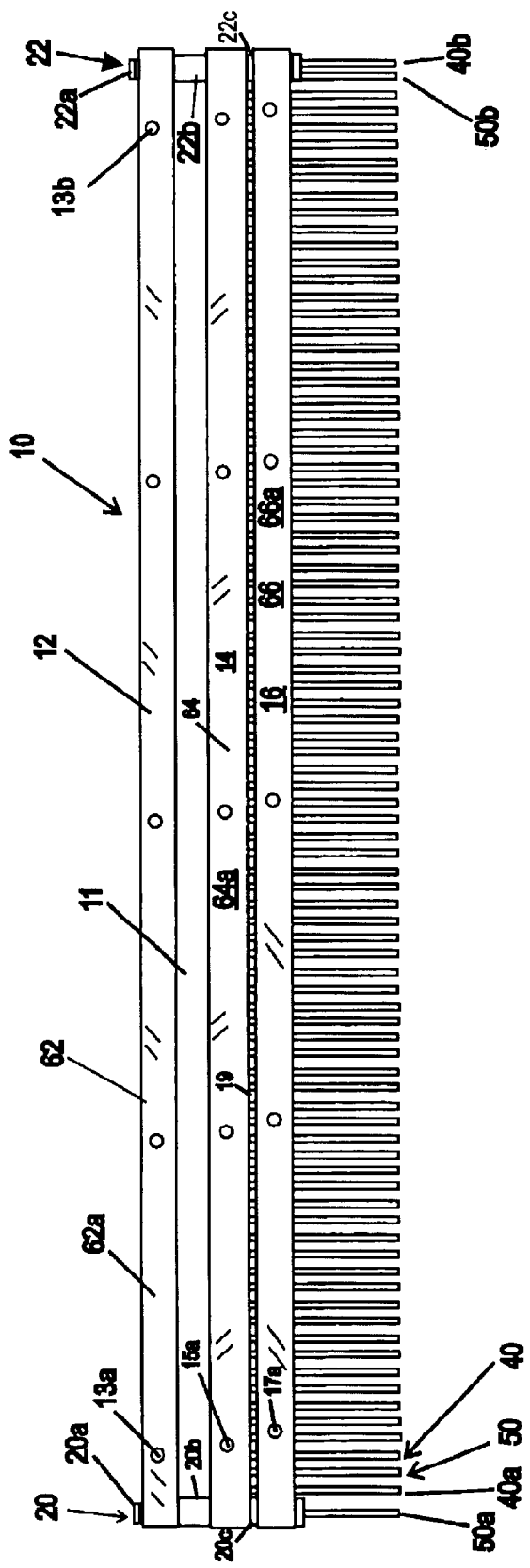
FIG. 4A shows a front view of the first pest control device.

The pest control device 10 may be bolted, screwed, nailed, or fixed in any other way to the door 101. FIGS. 4A, 5A, 6A, 7A, and 8A front, top, bottom, right side, and left side views of the pest control device 10 independent of the door 101. The pest control device 10 includes L-shaped brackets 12, 14, and 16, pins 30, 40, and 50, and attachment devices 20 and 22. There is a gap 11, between brackets 12 and 14 and a gap 19 between brackets 14 and 16, as shown in FIG. 4A.

The L-shaped bracket 12 is comprised of plates 62 and 72, which are perpendicular to one another and are fixed together. The L-shaped bracket 14 is comprised of plates 64 and 74, which are perpendicular to one another and are fixed together The L-shaped bracket 16 is comprised of plates 66 and 76, which are perpendicular to one another and are fixed together. The plates 62, 72, 64, 74, 66, and 76 are typically metal plates. Plates 62, 72, 64, 74, 66, and 76, have front and rear surfaces 62a–b, 72a–b, 64a–b, 74a–b, 66a–b, and 76a–b, respectively. Plate 74 and plate 76 of brackets 14 and 16, respectively, are perforated and are each comprised of a plurality of holes. For each of pins 30, 40, and 50 there is a corresponding hole in plate 74 through which each pin passes and through which each pin can slide up in the direction U until each pin reaches a position shown in FIG. 1A and down in the direction D until each pin reaches a position shown in FIG. 2A. One of these holes is hole 33a in plate 74, whose location is shown by dashed lines in FIG. 8A through which pin 30a can slide up and down. Similarly for each of pins 30, 40, and 50 there is a corresponding hole in plate 76 through which each pin passes and through which each pin can slide up in the direction U until each pin reaches a position shown in FIG. 1A and down in the direction D until each pin reaches a position shown in FIG. 2A. One of these holes is hole 35a in plate 76, whose location is shown by dashed lines in FIG. 8A through which pin 30a can slide up and down.

The attachment device 20 is comprised of bolt 20a, spacer 20b, spacer 20c, hex nut 20e, and washer 20f. Similarly the attachment device 22 is comprised of bolt 22a, spacer 22b, spacer 22c, hex nut 22e, and washer 22f. The attachment devices 20 and 22 fix the brackets 12, 14, and 16 to each other.

Figure 6A:
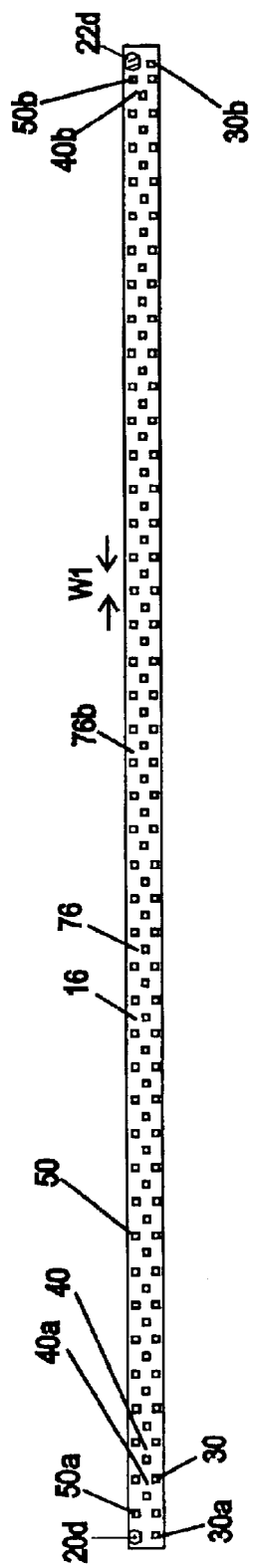
FIG. 6A shows a bottom view of the first pest control device.

The pins 30 include all the pins located in the row at the rear of the pest control device 10 as shown by FIGS. 1A and 6A. As shown in FIGS. 1A, 2A, and 3A, pins 30 would be located furthest away from the door 101. The pins 40 include all the pins in a middle row of the pest control device 10 as shown in FIG. 6A. The pins 50 include all the pins located in a row near the front of the pest control device 10 as shown in FIGS. 4A and 6A. Each of the pins is shown is inserted through holes in brackets 14 and 16. For example, pin 30a is inserted through hole 31a in bracket 14 and hole 35a in bracket 16. The locations of holes 31a and 35a are shown by dashed lines in FIG. 8A. Each of the pins 30, 40, and 50 have a head, which prevents them from falling through the brackets 14 and 16. For example pin 30a has a head 31a and pin 50a has a head 51a shown in FIG. 8A.

The pins 30, 40, and 50 can be placed in a first state, such as shown in FIG. 1A, so that all of the pins 30, 40, and 50 have their heads contacting the surface 72b of the plate 72 of the bracket 12. The pins 30, 40, and 50 cannot be moved any further upward in the direction U from this first state of FIG. 1A.

The pins 30, 40, and 50 can be placed in a second state, such as shown in FIG. 2A, so that all of the pins 30, 40, and 50 have their heads contacting the surface 74a of the plate 74 of the bracket 14. The pins 30, 40, and 50 cannot be moved any further downwards in the direction D from this second state of FIG. 2A.

The pins 30, 40, and 50 can be placed in a variety of other states in between the first state and second state of FIGS. 1A and 2A. Each pin may be placed in a different state. For example, pin 30a may be moved upwards until in a position as in FIG. 1A, while pin 30b may be moved downwards until in a position as in FIG. 2A. FIG. 3A shows a third state of the pest control device 10 where the pins have been placed in different positions. In the diagram of FIG. 3A, an uneven ground surface 300 has caused the pins to be located in various positions.

In operation the pest control device 10 is bolted, screwed or fixed in some other manner to the door 101 as show in FIGS. 1A, 2A, and 3A, through holes in brackets, 12, 14, and 16 such as holes 13b and 13a shown in FIG. 1. Screws 23b and 23a may be inserted through holes 13b and 13a, respectively, and screwed into door 101. The screws 23b and 23a may be termed an attachment device for attaching the pest control device 10 to the door 101. Each of the pins 30, 40, and 50 can move from the position shown in FIG. 1A to the position shown in FIG. 2A and anywhere in between. The door 101 is typically connected to a door lowering apparatus, not shown, known in the art for raising and lowering a warehouse roller door, or a garage door. The door 101 is lowered so that the pins 30, 40, and 50 come in contact with a ground or horizontal surface, such as surface 300. The surface 300 shown in FIG. 3A is uneven and has raised portions such as raised portion 300a and depressed portions such as depressed portion 300b.

Just before the pins 30, 40, and 50 come in contact with the surface 300 the pins are in the state shown in FIG. 2A. I.e. all of the pins 30, 40, and 50 have their heads contacting surface 74a of plate 74 of bracket 14. The pins 30, 40, and 50 in FIG. 2A have fallen downwards in the direction D as far downwards as they can go. As the door 101 is lowered some of the pins 30, 40, and 50 begin to come in contact with portions of the surface 300. For example, pins 30c and 40c come into contact with raised portion 300a of the surface 300. This causes pins 30c and 40c to be pushed upwards in the direction U. The pins 30c and 40c are pushed upwards in the direction U either until they hit the plate 72 of the bracket 12 or until the door 101 has been lowered an acceptable distance.

Eventually the door 101 is lowered until other pins, such as pins 40b and 30b come in contact with the depressed portion 300b of the surface 300. The pins 40b and 30b will be pushed upwards in the direction U, but not as far upwards as the pins 30c and 40c, because of the uneven surface 300. The door 101 should be lowered until all the pins 30, 40, and 50 contact a portion of the surface 300. As shown by FIG.

3A, because all of the pins 30, 40, and 50 contact a portion of the surface 300, a fence is created which prevents pests, such as rodents, from getting into a building. The spacing W1, shown in FIG. 6A, between the adjacent pins in any of the rows of pins 30, 40, and 50 should be as small as possible and may be one quarter of an inch. The spacing between one pin of pins 30 and the closest pin of pins 40, such as between pins 30a and 40a in FIG. 4A, should be much less due to the interleaving of rows of pins 30, 40, and 50. The spacing between pins 30a and 40 may be one eighth of any inch. The pins can be made of metal such as steel, iron, or aluminum or any other suitable material. The pins 30, 40, and 50 typically will be perpendicular or substantially perpendicular to the bottom surface 101a of the door 101.

A single bar or plate can be used instead of L shaped brackets 14 and 16. For example, plates 64 and 66 can be eliminated and perforated plates 74 and 76 can be used by themselves. The heads of each pin, such as the head 31a of the pin 30a in FIG. 8A, are larger than the diameter of its corresponding holes such as holes 33a and 35a. The diameter of the body portion of each pin, such as body portion 37a of pin 30a is less than its corresponding holes such as holes 33a and 35a, which allows the pin 30a to slide within the holes 33a and 35a. The diameter of the body portion of each pin, such as body portion 37a of pin 30a, may be one-eighth of an inch and the diameter of the holes, such as holes 33a and 35a may be slightly greater than one-eighth of an inch.

FIGS. 1B, 2B, 3B, 4B, 4C, 5B, 6B, 6C, 7B, and 8B refer to a second pest control device 410 in accordance with a second embodiment of the present invention. FIG. 1B shows a rear view of an apparatus 400 including the pest control device 410 attached to the door 101 with the pest control device 410 shown in a first state. FIG. 2B shows a rear view of the apparatus 400 of FIG. 1B with the pest control device 410 shown in a second state. FIG. 3B shows a rear view of the apparatus 400 of FIG. 1B with the pest control device 410 shown in a third state.

Figure 4B:
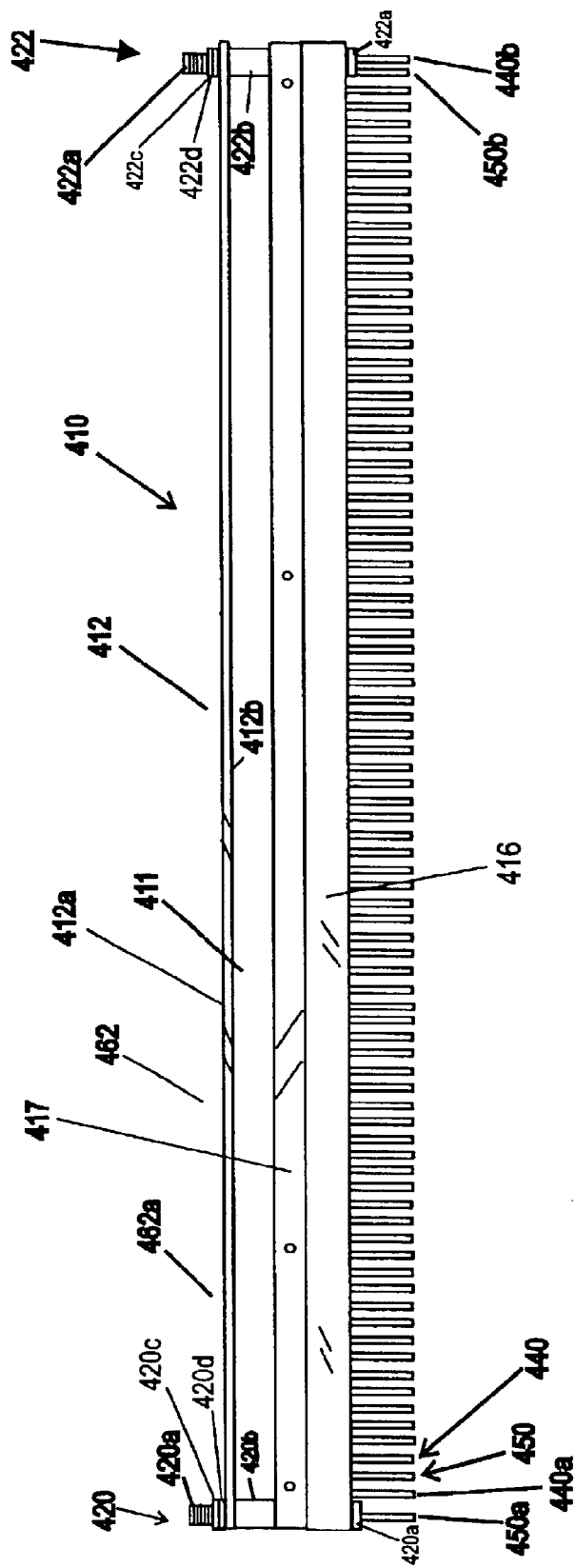
FIG. 4B shows a front view of the second pest control device with all of the plurality of pins in a downward state or position.
Figure 4C:
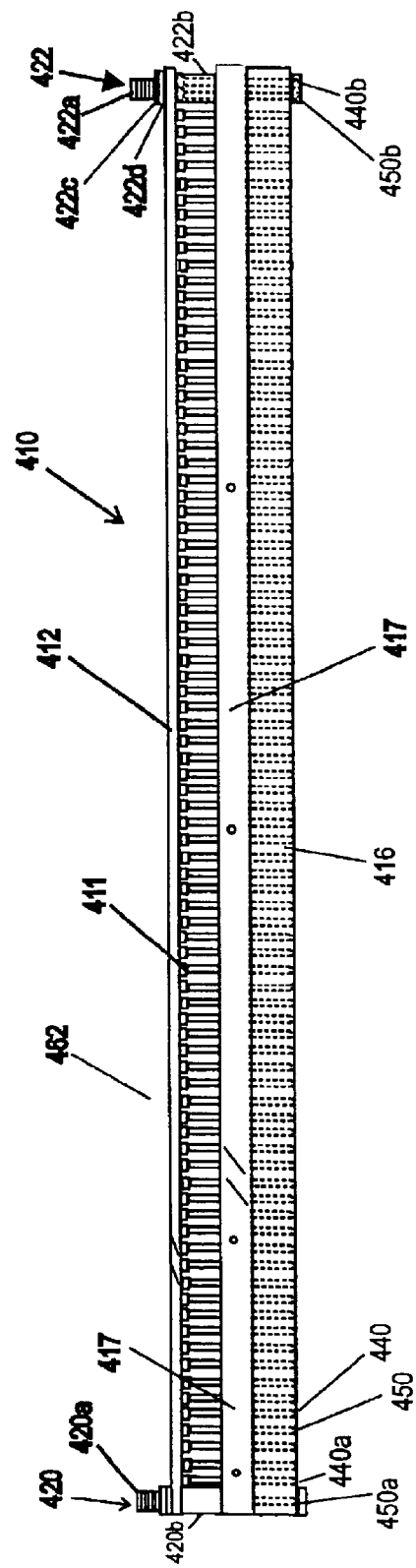
FIG. 4C shows a front view of the second pest control device with all of the plurality of pins in an upward state or position.

The pest control device 410 may be bolted, screwed, nailed, or fixed in any other way to the door 101 as for the previous pest control device 10. FIGS. 4B, 5B, 6B, 7B, and 8B show front, top, bottom, right side, and left side views of the pest control device 410 independent of the door 101. FIG. 4B shows a front view of the pest control device 410 with pins in a downward state or position and FIG. 4C shows a front view of the pest control device 410 with pins in an upward state or position. FIG. 6C shows a bottom view of a bar or member 416 for use with the pest control device 410.

The pest control device 410 includes a top plate 412, a solid bar 416 (except for a plurality of pin holes 452, such as 452a), pins 430, 440, and 450, and attachment devices 420 and 422. The solid bar 416 is attached to a plate 417 which can be fixed to the door 101. There is a gap 411 shown in FIG. 2B, between top plate 412 and top surface 416a of bar or member 416. The plate 417 may have openings 417a–d shown in FIG. 2B. Screws, nails, nails or bolts can be inserted through openings 417a–d to attach the plate 417 and thus the bar or member 416 to the door 101.

The top plate 412 can be metal or plastic and is used to restrict the movement of the pins 430, 440, and 450. The top plate 412 has a top surface 412a and a bottom surface 412b.

Member 416 may be a solid bar except for a plurality of perforations or holes 452, such as hole 452a shown in FIG. 6C. For each of pins 430, 440, and 450 there is a corresponding hole in member 416 through which each pin passes and through which each pin can slide up in the direction U, shown in FIG. 1B, until each pin reaches a position shown in FIG. 1B, where it contacts the bottom surface 412b of the top plate 412, and down in the direction D until each pin reaches a position shown in FIG. 2B, where the head of the pin contacts the top surface 416a of the member or bar 416. In the up position of FIG. 1B, each of the pins 430, 440, and 450 is inside or above the bar 416. This can be seen clearly, for pins 440 and 450 in FIG. 4C where the part of pins 440 and 450 inside of the bar 416 are shown in dashed lines. Allowing the pins 430, 440 and 450 to be pushed in so that no pins stick out the bar 416, prevents someone from being injured by a protruding pin.

The attachment device 420 is comprised of bolt 420a, spacer 420b, hex nut 420c, and washer 420d. Similarly the attachment device 422 is comprised of bolt 422a, spacer 422b, hex nut 422c, and washer 422d. The attachment devices 420 and 422 fix the member 416 to the top plate 412.

Figure 6B:
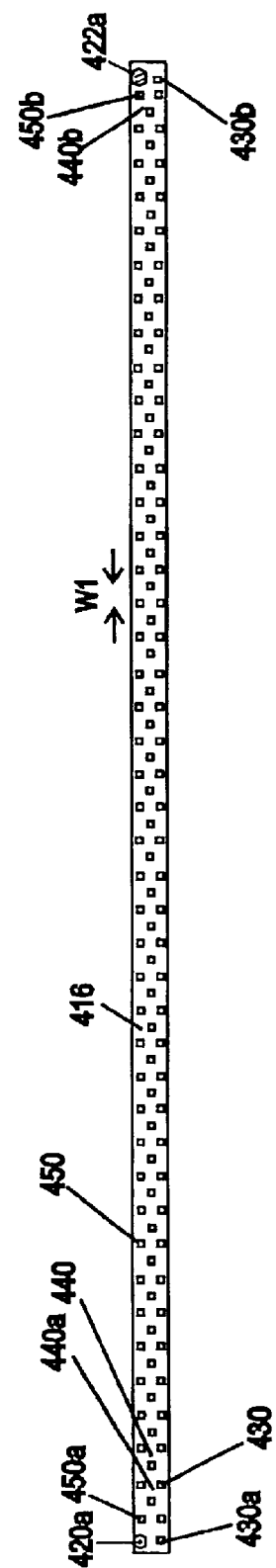
FIG. 6B shows a bottom view of the second pest control device.

The pins 430 include all the pins located in the row at the rear of the pest control device 410 as shown by FIGS. 1B and 6B. As shown in FIGS. 1B, 2B, and 3B, pins 430 would be located furthest away from the door 101. The pins 440 include all the pins in a middle row of the pest control device 410 as shown in FIG. 6B. The pins 450 include all the pins located in a row near the front of the pest control device 410 as shown in FIGS. 48 and 6B. Each of the pins 430, 440, and 450 is inserted through holes in member 416. For example, pin 430a is inserted through hole 431a in member 416. The location of hole 431a is shown by dashed lines in FIG. 8B. Each of the pins 430, 440, and 450 have a head, which prevents them from falling through the member 416. For example pin 30a has a head 31a and pin 450a has a head 451a shown in FIG. 8B.

The pins 430, 440, and 450 can be placed in a first state, such as shown in FIG. 1B, so that all of the pins 430, 440, and 450 have their heads contacting the surface 412b of the top plate 412. The pins 430, 440, and 450 cannot be moved any further upward in the direction U from this first state of FIG. 1B.

The pins 430, 440, and 450 can be placed in a second state, such as shown in FIG. 2B, so that all of the pins 430, 440, and 450 have their heads contacting the top surface 416a of the member 416. The pins 430, 440, and 450 cannot be moved any further downwards in the direction D from this second state of FIG. 2B.

The pins 430, 440, and 450 can be placed in a variety of other states in between the first state and second state of FIGS. 1B and 2B. Each pin may be placed in a different state. For example, pin 430a may be moved upwards until in a position as in FIG. 1B, while pin 430b may be moved downwards until in a position as in FIG. 2B. FIG. 3B shows a third state of the pest control device 410 where the pins 430, 440, and 450, have been placed in different positions. In the diagram of FIG. 3B, an uneven ground surface 500 has caused the pins to be located in various positions. The ground surface 500 is comprised of higher elevation 500a and lower elevation 500b. Pin 430c is pushed in further than pin 430b as a result of the uneven ground surface.

In operation, the pest control device 410 is bolted, screwed or fixed in some other manner to the door 101 as show in FIGS. 1B, 2B, and 3B, through holes in the plate 417 which is attached to member 416, such as holes 417a–d shown in FIG. 2B. Screws 427a and 427d. shown in FIG. 2B, may be inserted through holes 417a and 417d, respectively, and screwed into door 101. The screws 427a and 427d may be termed an attachment device for attaching the pest control device 410 to the door 101. Each of the pins 430, 440, and 450 can move from the position shown in FIG. 1B to the position shown in FIG. 2B and anywhere in between. The door 101 is typically connected to a door lowering apparatus, not shown, known in the art for raising and lowering a warehouse roller door, or a garage door. The door 101 is lowered so that the pins 430, 440, and 450 come in contact with a ground or horizontal surface, such as surface 500. The surface 500 shown in FIG. 3B is uneven and has raised portions such as raised portion 500a and depressed portions such as depressed portion 500b.

Just before the pins 430, 440, and 450 come in contact with the surface 500 the pins are in the state shown in FIG. 2B. I.e. all of the pins 430, 440, and 450 have their heads contacting surface 416a of the member 416. The pins 430, 440, and 450 in FIG. 2B have fallen downwards in the direction D as far downwards as they can go. As the door 101 is lowered some of the pins 430, 440, and 450 begin to come in contact with portions of the surface 500. For example, pins 430c and 440c come into contact with raised portion 500a of the surface 500. This causes pins 430c and 440c to be pushed upwards in the direction U. The pins 430c and 440c are pushed upwards in the direction U either until they hit the surface 412b of the top plate 412 or until the door 101 has been lowered an acceptable distance.

Eventually the door 101 is lowered until other pins, such as pins 440b and 430b come in contact with the depressed portion 500b of the surface 500. The pins 440b and 430b will be pushed upwards in the direction U, but not as far upwards as the pins 430c and 440c, because of the uneven surface 500. The door 101 should be lowered until all the pins 430, 440, and 450 contact a portion of the surface 500. As shown by FIG. 3B, because all of the pins 430, 440, and 450 contact a portion of the surface 500, a fence is created which prevents pests, such as rodents, from getting into a building. The spacing W1, shown in FIG. 6A, between the adjacent pins in any of the rows of pins 430, 440, and 450 should be as small as possible and may be one quarter of an inch. The spacing between one pin of pins 430 and the closest pin of pins 440, such as between pins 430a and 440a in FIG. 4B, should be much less due to the interleaving of rows of pins 430, 440, and 450. The spacing between pins 430a and 440 may be one eighth of any inch. The pins can be made of metal such as steel, iron, or aluminum or any other suitable material. The pins 430, 440, and 450 typically will be perpendicular or substantially perpendicular to the bottom surface 101a of the door 101.

Figure 9B:
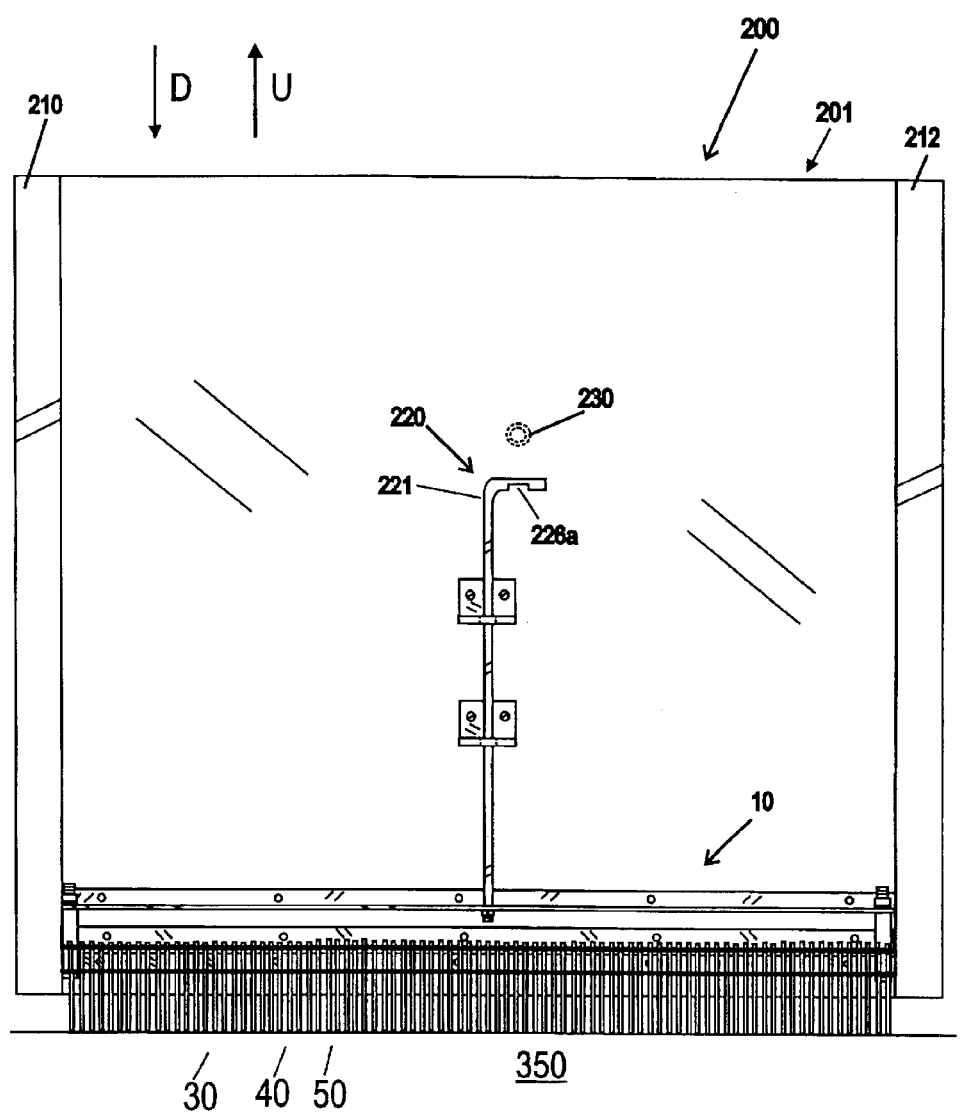
FIG. 9B shows another embodiment of the present invention with the first pest control device shown in a lowered position.

FIG. 9A shows an apparatus 200 in accordance with another embodiment of the present invention wherein a device 220 for raising and lowering the pest control device 10 (or the pest control device 410) is provided, with the pest control device 10 shown in a raised position. FIG. 9B shows the second embodiment of the present invention with the pest control device 10 in a lowered position. The device 220 is particularly useful with a stiff, non roller door 201. The apparatus 200 is comprised of the door 201, door frames 210 and 212, device 220 and pest control device 10. The combination of the device 220 and the pest control device 10 can also be considered a pest control device in accordance with the present invention.

Figure 10:
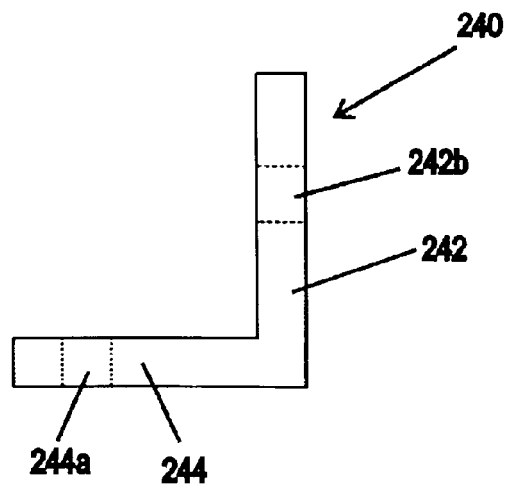
FIG. 10 shows a right side view of a bracket for use with the embodiment of FIGS. 9A and 9B.

The device 220 includes a curved or L-shaped pipe 221, a screw 230, and brackets 240 and 250. The L-shaped pipe 221 may be comprised of elongated portion 222, curved portion 224, and extension 226. The extension 226 may have a notch 226a shown in FIG. 9B. The bracket 240 may have a portion 242 and a portion 244, shown in FIG. 10, which may be perpendicular to each other. The portion 242 may have openings 242a and 242b and the portion 244 may have an opening 244a as shown by FIGS. 9A–B and 10. FIG. 10 is a right side view of the bracket 240. Screws 246 and 248 may be inserted through openings 242a and 242b, respectively, and screwed into the door 201 to mount the bracket 240 to the door 201. The elongated portion 222 of the L-shaped pipe 221 has a diameter smaller than the opening 244a in portion 244 to allow the elongated portion 222 to be inserted into the opening 244a of the portion 244 of the bracket 240 to allow the elongated portion 222 to slide up and down, in the directions U and D, within the opening 244a.

Similarly, the bracket 250 may be identical to the bracket 240 and may have a portion 252 and a portion 254, shown in FIGS. 9B and 9B, which may be perpendicular to each other. The portion 252 may have openings 252a and 252b and the portion 254 may have an opening 254a as shown by FIGS. 9A–B. Screws 256 and 258 may be inserted through openings 252a and 252b, respectively, and screwed into the door 201 to mount the bracket 250 to the door 201. The elongated portion 222 of the L-shaped pipe 221 has a diameter smaller than the opening 254a in portion 254 to allow the elongated portion 222 to be inserted into the opening 254a of the portion 254 of the bracket 250 and to allow the elongated portion 222 to slide up and down, in the directions U and D, within the opening 254a.

In operation the device 220 and the pest control device 10 can be placed in a raised position with respect to the door 201, as shown in FIG. 9A. In the raised position of FIG. 9A, the pest control device 210 remains above the bottom door surface 201a, and the pins 30, 40, and 50 of the pest control device 10 will not touch a ground surface 350. In the raised position of FIG. 1A, the notch 226a is on top of the body portion 230b of the screw 230. The body portion 230b of the screw 230 prevents the L-shaped pipe 221 and the pest control device 10 from moving downwards in the direction D. The L-shaped pipe 221 is fixed at end 221a, which may be threaded, to the pest control device 10 by a nut 229.

The device 220 and the pest control device 10 can be placed in a lowered state by first slightly raising the L-shaped pipe 221 to take the extension 226 off of the screw 230. The L-shaped pipe 221 can then be rotated and then lowered, thus lowering the pest control device which is fixed to the L-shaped pipe 221. The device 220 and the pest control device 10 can be lowered until the pins 30, 40, and 50 contact the ground surface 350. The ground surface is shown as an even surface in FIG. 9B for simplicity of description, but in most cases the ground surface will be uneven as in FIG. 3A.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a door having a bottom surface;
   a pest control device comprising
   a first member, which has a plurality of holes but is otherwise substantially solid;
   a plurality of pins, each of which slides within one of the plurality of holes of the first member;
   wherein the first member is fixed to the door so that each of the plurality of pins is substantially perpendicular to the bottom surface of the door;

wherein each of the plurality of pins can slide independently of each of the other pins of the plurality of pins; and wherein each of the plurality of pins has an orientation that is substantially fixed and substantially parallel with respect to each of the other pins of the plurality of pins; and wherein an uneven ground surface can cause one of the plurality of pins to be pushed upwards a greater distance than another of the plurality of pins.

2. The apparatus of claim 1 wherein the first member has a first surface;

wherein each of the plurality of pins can be pushed up into the first member so that none of the plurality of pins protrudes out of the first member beyond the first surface.

3. The apparatus of claim 1 wherein the first member is fixed to a first plate which is fixed to the door.

4. The apparatus of claim 1 wherein the plurality of pins can move with respect to the first member without rotating with respect to the first member.

5. A method comprising the steps of fixing a pest control device to a door having a bottom surface;

wherein the pest control device comprises a first member, which has a plurality of holes but is otherwise substantially solid;

and a plurality of pins, each of which slides within one of the plurality of holes of the first member; and wherein the first member is fixed to the door so that each of the plurality of pins is substantially perpendicular to the bottom surface of the door;

wherein each of the plurality of pins can slide independently of each of the other pins of the plurality of pins;

wherein each of the plurality of pins has an orientation that is substantially fixed and substantially parallel with respect to each of the other pins of the plurality of pins; and wherein an uneven ground surface can cause one of the plurality of pins to be pushed upwards a greater distance than another of the plurality of pins.

6. The method of claim 5 wherein the first member has a first surface;

and wherein each of the plurality of pins can be pushed up into the first member so that none of the plurality of pins protrudes out of the first member beyond the first surface.

7. The method of claim 6 wherein the first member is fixed to a first bracket, which is fixed to the door.

8. The method of claim 5 wherein the plurality of pins can move with respect to the first member without rotating with respect to the first member.

9. The method of claim 5 wherein the plurality of pins are connected to the first member so that each of the plurality of pins can move with respect to the first member without rotating with respect to the first member;

and further comprising raising or lowering the pest control device, wherein when the pest control device is raised or lowered, the first member is raised or lowered, respectively.

* * * * *